Patented Sept. 3, 1929.

1,727,267

UNITED STATES PATENT OFFICE.

MARCEL BADER AND CHARLES SUNDER, OF MULHOUSE, FRANCE, AND THÉODORE VOLTZ, OF BASEL, SWITZERLAND, ASSIGNORS TO THE FIRM DURAND & HUGUENIN S. A., OF BASEL, SWITZERLAND.

PREPARATION OF ESTERLIKE DERIVATIVES OF VAT DYESTUFFS.

No Drawing. Application filed July 27, 1923, Serial No. 654,272, and in Germany August 21, 1922.

The U. S. Patent No. 1,448,251 discloses a process for the manufacture of water-soluble ester-like derivatives of vat-dyestuffs, especially valuable for dyeing and printing purposes, consisting in treating the leuco-compounds of vat-dyestuffs with chlorosulfonic acid in presence of a tertiary base, that is a tertiary organic nitrogen-containing base with or without the use of an indifferent diluent.

Now we have found that in this process the chlorosulfonic acid can be replaced by salts of this acid, such as the sodium chlorosulfonate. This modification allows of the reduction of the quantity to be used on tertiary base, because no free acid is present in the reaction mass which would require a corresponding amount of the tertiary base.

*Example.*

26 parts of leuco-indigo are introduced, while stirring, at ordinary temperature and with displacement of air by carbondioxide into a mixture of 120 parts of chlorobenzene, 36 parts of dimethylaniline and 40 parts of sodiumchlorosulfonate, 87 per cent. The mass is then agitated for some time in the cold and thereupon brought slowly to 50–60° C. The stirring is continued until the end of the reaction. Afterwards, an alkali is added and the dimethylaniline and chlorobenzene are distilled off by introduction of steam. The residual solution is filtered hot. A small quantity of indigo remains on the filter, while the solution is allowed to cool down in order to crystallize out the ester salt. The latter is soluble in water and especially valuable for dyeing and printing purposes; by means of a suitable oxidizing agent with acid the original dyestuff is reformed.

The body obtained probably corresponds to the formula:

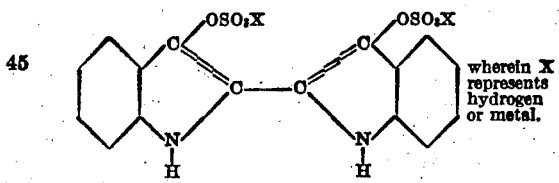

wherein X represents hydrogen or metal.

If X stands for sodium, there is a sodium salt which is easily soluble in water.

The herein described modification of the process can be applied in the same sense and to the same extent as in the U. S. patent above referred to.

What we claim is:

1. A process for the manufacture of stable esterlike derivatives of vat dyestuffs in solid form soluble in water, consisting in treating a leuco compound of a vat dyestuff with a salt of a halogen sulfonic acid in presence of a tertiary organic nitrogen-containing base capable of promoting the esterification.

2. A process for the manufacture of stable esterlike derivatives of vat dyestuffs in solid form soluble in water, consisting in treating a leuco compound of a vat dyestuff with a salt of chlorosulfonic acid in presence of a tertiary organic nitrogen-containing base capable of promoting the esterification.

3. A process for the manufacture of stable esterlike derivatives of vat dyestuffs in solid form soluble in water, consisting in treating a leuco compound of a vat dyestuff with a salt of chlorosulfonic acid in presence of dimethylaniline.

4. A process for the manufacture of stable esterlike derivatives of vat dyestuffs in solid form soluble in water, consisting in treating the leuco compound of indigo with a salt of a halogen sulfonic acid in presence of a tertiary organic nitrogen-containing base capable of promoting the esterification.

5. A process for the manufacture of stable esterlike derivatives of vat dyestuffs in solid form soluble in water, consisting in treating a leuco compound of a vat dyestuff with an alkali salt of a halogen sulfonic acid in presence of a tertiary organic nitrogen-containing base capable of promoting the esterification.

6. A process for the manufacture of stable esterlike derivatives of vat dyestuffs in solid form soluble in water, consisting in treating the leuco compound of indigo with a salt of chlorosulfonic acid in presence of a tertiary organic nitrogen-containing base capable of promoting the esterification.

7. A process for the manufacture of stable esterlike derivatives of vat dyestuffs in solid form soluble in water, consisting in treating the leuco compound of indigo with a salt of chlorosulfonic acid in presence of dimethylaniline.

8. A process for the manufacture of stable esterlike derivatives of vat dyestuffs in solid form soluble in water, consisting in treating the leuco compound of indigo with an alkali salt of chlorosulfonic acid in presence of dimethylaniline.

In witness whereof we have hereunto signed our names this 12th day of July 1923.

MARCEL BADER.
CHARLES SUNDER.
THÉODORE VOLTZ.